(12) United States Patent
Jeong et al.

(10) Patent No.: US 12,522,767 B2
(45) Date of Patent: Jan. 13, 2026

(54) LOW DIELECTRIC, HIGH HEAT-DISSIPATION LIQUID CRYSTAL POLYMER COMPOSITION FOR MILLIMETER WAVE BAND, AND METHOD FOR PRODUCING SAME

(71) Applicant: INDUSTRIAL COOPERATION FOUNDATION JEONBUK NATIONAL UNIVERSITY, Jeonjusi (KR)

(72) Inventors: Kwang-Un Jeong, Jeonju-si (KR); Dong-Gue Kang, Bucheon-si (KR); Jahyeon Koo, Jeonju-si (KR); Hyeyoon Ko, Jeonju-si (KR); Minwoo Rim, Jeonju-si (KR); Youngjae Wi, Jeonju-si (KR)

(73) Assignee: INDUSTRIAL COOPERATION FOUNDATION JEONBUK NATIONAL UNIVERSITY, Jeollabuk-do (KR)

( * ) Notice: Subject to any disclaimer, the term of this patent is extended or adjusted under 35 U.S.C. 154(b) by 0 days.

(21) Appl. No.: 18/027,830

(22) PCT Filed: Mar. 23, 2021

(86) PCT No.: PCT/KR2021/003593
§ 371 (c)(1),
(2) Date: Mar. 22, 2023

(87) PCT Pub. No.: WO2022/114405
PCT Pub. Date: Jun. 2, 2022

(65) Prior Publication Data
US 2023/0332046 A1  Oct. 19, 2023

(30) Foreign Application Priority Data
Nov. 27, 2020 (KR) ........................ 10-2020-0161897

(51) Int. Cl.
*G02F 1/1333* (2006.01)
*C09K 19/02* (2006.01)
*C09K 19/04* (2006.01)
*C09K 19/06* (2006.01)
*C09K 19/32* (2006.01)
*C09K 19/38* (2006.01)

(52) U.S. Cl.
CPC ............ *C09K 19/322* (2013.01); *C09K 19/02* (2013.01); *C09K 19/04* (2013.01); *C09K 19/062* (2013.01); *C09K 19/3814* (2013.01); *C09K 2019/323* (2013.01); *C09K 2219/03* (2013.01)

(58) Field of Classification Search
CPC ...... C09K 19/322; C09K 19/02; C09K 19/04; C09K 19/38; C09K 19/062; C09K 19/3814; C09K 2019/0444; C09K 2019/323; C09K 2219/03
See application file for complete search history.

(56) References Cited

U.S. PATENT DOCUMENTS

2019/0352466 A1* 11/2019 Uta .................. C08G 77/52
2023/0332046 A1* 10/2023 Jeong ................ C09K 19/04

FOREIGN PATENT DOCUMENTS

| JP | 2001-002680 A | * | 1/2001 | ............. G02F 1/137 |
| KR | 10-2014-0019325 A | | 2/2014 | |
| KR | 10-2015-0132195 A | | 11/2015 | |
| KR | 10-2016-0090153 A | | 7/2016 | |

OTHER PUBLICATIONS

Kang et al., "Anisotropic Thermal Interface Materials: Directional Heat Transfer in Uniaxially Oriented Liquid Crystal Networks", 2018, ACS Appl. Mater. Interfaces, vol. 10, pp. 35557-35562. (Year: 2018).*
Machine Translation of JP 2001-002680 A (Year: 2001).*
Kang, D.-G. et al., "Anisotropic thermal interface materials: directional heat transfer in uniaxially oriented liquid crystal networks", ACS applied materials & interfaces, 2018, vol. 10, No. 41, pp. 35557-35562 (inner pp. 1-25).
Kim, Y. H. et al., "Thermally stable siloxane hybrid matrix with low dielectric loss for copper-clad laminates for high-frequency applications", ACS applied materials & interfaces, 2016, vol. 8, No. 13, pp. 83 35-8340.
Rousseau, I. A. et al., "Tailored phase transitions via mixed-mesogen liquid crystalline polymers with silicon-based spacers", Macromolecules, 2005, vol. 38, No. 10, pp. 4103-4113.

* cited by examiner

*Primary Examiner* — Geraldina Visconti
(74) *Attorney, Agent, or Firm* — Bridgeway IP Law Group, PLLC; Jihun Kim

(57) ABSTRACT

Proposed is a dielectric material of a liquid-crystal polymer composition including a low-dielectric and high-heat-dissipating liquid-crystal-material monomer for a millimeter wave band and a polymer thereof, and more particularly, a liquid-crystal polymer composition including a low-dielectric and high-heat-dissipating liquid-crystal-material monomer for a millimeter wave band and a polymer thereof, the liquid-crystal-material monomer including a mesogen core, a silane-based group, and a polymerization reactive group.

9 Claims, 8 Drawing Sheets

LOW DIELECTRIC, HIGH HEAT-DISSIPATION LIQUID CRYSTAL POLYMER COMPOSITION FOR MILLIMETER WAVE BAND, AND METHOD FOR PRODUCING SAME

TECHNICAL FIELD

The present invention relates to a low-dielectric and high-dissipating liquid-crystal polymer composition for a millimeter wave band, and more particularly, to a low-dielectric and high-heat-dissipating liquid-crystal polymer composition for a millimeter wave band, including one or more of a mesogen core, a silane-based group, and a polymerization reactive group.

BACKGROUND ART

The next generation (5G) is wireless communication in which ultra-high-speed communication and transmission are achieved by supporting a frequency of 6 GHz or lower, called Sub-6, and a millimeter wave, a high-band frequency of 28 GHz or higher. Ultra-high-speed communication and transmission of materials for such 5G wireless communication may be achieved through the lossless transmission of high-frequency signals from PCBs.

Methods of developing dielectric materials for PCB copper-clad laminate boards applied to frequency bands of the next generation (5G) by using existing polyimide-based materials have limitations in reducing transmission loss in a high-frequency band of 28 GHz or higher.

Currently, various dielectric materials, such as modified polyimide, olefin series, and epoxy series, are being developed to cope with such high frequencies, but they have a high dielectric loss, high hygroscopicity, poor mechanical properties, poor heat resistance, and poor processability.

In addition, existing dielectric materials using liquid-crystal polymers of polyester resins have problems of deterioration in physical properties and high production costs due to high-temperature processes.

Meanwhile, due to the nature of communication technology, it is important to effectively dissipate accumulated heat. However, it is difficult to reduce rapidly increasing thermal density of devices by using methods, such as geometric heat-dissipation design to maximize surface area by extrusion molding of existing aluminum or copper, and increasing of radiation efficiency through blackening of heat dissipating structures.

Therefore, required is the development of dielectric materials for copper-clad laminate boards, which have a low dielectric loss to prevent loss of millimeter wave signals which are high-bandwidth frequencies of 28 GHz or higher for 5G wireless communication, high hygroscopicity, excellent mechanical properties, excellent heat resistance, excellent processability, and excellent heat dissipation, and which can be processed at low temperatures.

PRIOR ART DOCUMENT

Patent Document

Patent Document 1: Korea Patent Publication No. 10-2016-0090153

DISCLOSURE

Technical Problem

In order to solve the above problems in the related art, the present invention aims to develop a low-dielectric and high-heat-dissipating liquid-crystal polymer composition for a millimeter wave band, which has low hygroscopicity and excellent electrical, chemical, and thermal characteristics by forming a polymer network by being bonded with a silane-based functional group and/or a crosslinking agent, capable of imparting low-dielectric and high-strength characteristics based on mesogens exhibiting high thermal conductivity.

In addition, according to an embodiment of the present invention, there is provided a low-dielectric and high-heat-dissipating liquid-crystal polymer composition for a millimeter wave band, capable of effectively dissipating heat by using, as a heat-dissipating material, an organic material having advantages, such as lightweight, easy processing, varieties of forms, and low cost.

It is another object of the present invention to provide a low-dielectric and high-heat-dissipating liquid-crystal polymer composition for a millimeter wave band, whereby deterioration in physical properties may be prevented and production costs may be reduced by being processed in the form of a liquid-crystal-material monomer or liquid-crystal oligomer and being processed at a low temperature.

In addition, in order to accomplish the above objects, there is provided a method of producing a low-dielectric and high-heat-dissipating liquid-crystal polymer composition for a millimeter wave band.

Technical Solution

To accomplish the above object, there is provided a liquid-crystal polymer composition including a polymer of a liquid-crystal-material monomer including one or more of a rod-shaped or plate-shaped mesogen core (C), a silane-based group (S), and a polymerization reactive group (F).

The liquid-crystal-material monomer may be of: i) a type including the mesogen core (C) and the silane-based group (S) (see Type 1 below); ii) a type including the mesogen core (C), the silane-based group (S), and the polymerization reactive group (F) (see Type 2 below); iii) a type including the mesogen core (C) and the polymerization reactive group (F) (see Type 3 below); iv) a type including the silane-based group (S) (see Type 4 below); or v) a type including the silane-based group (S) and the polymerization reactive group (F) (see Type 5 below).

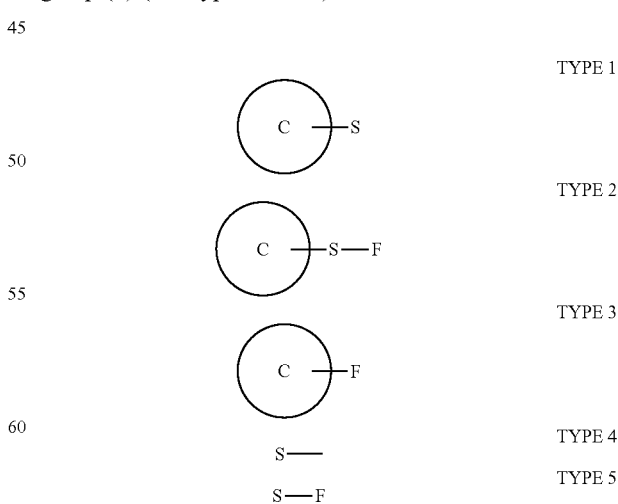

In the types i) to v), the silane-based group (S) and the polymerization reactive group (F) may undergo a polymerization reaction at each position.

In addition, the polymer of the liquid-crystal polymer composition including one or more polymers of liquid-crystal-material monomers of the types i) to v) may be ① a copolymer of two or more liquid-crystal-material monomers among the liquid-crystal-material monomers of the types i) to v), ② a homopolymer in which the liquid-crystal-material monomers of the types i) to v) are each independently polymerized, or ③ a mixture of the copolymer and the homopolymer.

The copolymer and the homopolymer may form a polymer network by connecting polymerization reactive groups (F) of the liquid-crystal-material monomers of i) to v) together in the form of a chain derivative.

The copolymer and the homopolymer may form a polymer network by connecting polymerization reactive groups (F) of the liquid-crystal-material monomers of i) to v) together in the form of a chain derivative.

In addition, each of the mesogen core (C), the silane-based group (S), and the polymerization reactive group (F) may include a linking group (A) of hydrocarbon including a heteroatom, and structures of the mesogen core (C), the silane-based group (S), and the polymerization reactive group (F) of the types i) to iii) and v) may be connected to each other by using the linking group (A) of the hydrocarbon including the heteroatom.

The liquid-crystal-material monomer may be polymerized by heat, ultraviolet rays, chemicals, or the like by using a reaction, such as radical polymerization, condensation polymerization, cyclopolymerization, or ionic polymerization.

In addition, there is provided a method of producing a liquid-crystal polymer composition including a polymer of the liquid-crystal-material monomer.

Advantageous Effects

A liquid-crystal polymer composition according to the present invention has characteristics of low dielectric and high heat dissipation, and thus, is suitable as a dielectric material for a millimeter wave band.

In addition, the liquid-crystal polymer composition according to the present invention has low hygroscopicity and excellent mechanical, electrical, chemical, and thermal characteristics, and in particular, allows device processing even at a low temperature, thus unlike dielectric materials of the related art, on which high-temperature processing is performed, preventing deterioration in physical properties of devices, which occurs during high-temperature device processing, and reducing production costs, and thus, has excellent processability.

The liquid-crystal polymer composition having such characteristics according to the present invention can effectively control heat and has excellent physical properties and excellent processability, and thus, has advantages of being used as a material for future industries, such as next-generation communication product industries, self-driving automobile industries, and electronics, military, and aviation industries, requiring the use of the composition in a band of 28 GHz or higher.

MODE FOR INVENTION

Figure 1:
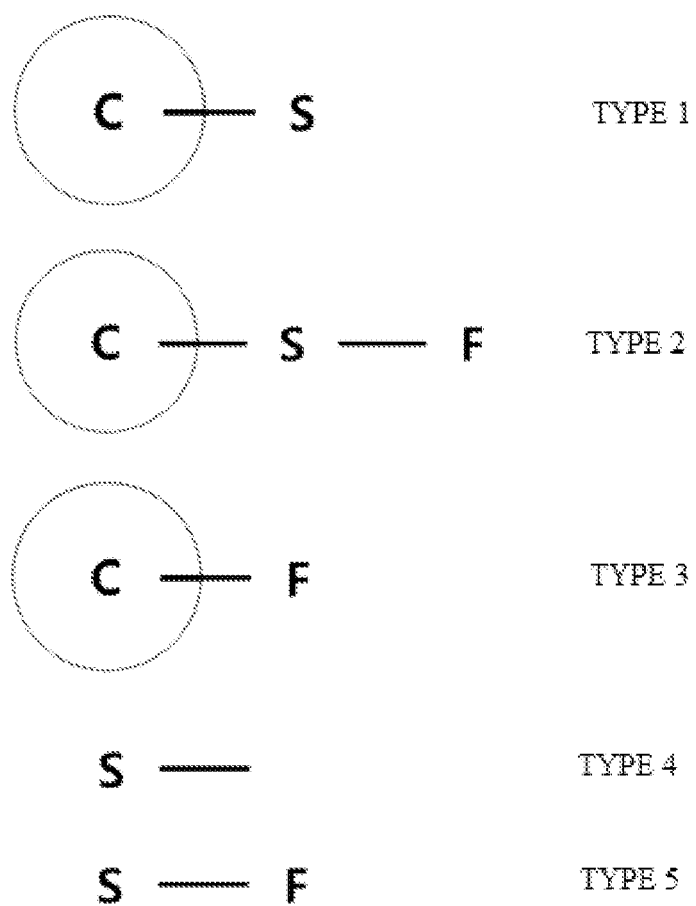
FIG. 1 shows a structure of a liquid-crystal-material monomer of the present invention.

Hereinafter, preferred embodiments of the present invention will be described in detail. In describing the present invention, in a case where it is determined that a detailed description of the related known art may obscure the gist of the present invention, the detailed description will be omitted. Throughout the specification, when a portion "includes" an element, another element may be further included, rather than excluding the existence of the other element, unless otherwise described. In addition, certain features presented in the drawings are enlarged, reduced, or simplified for ease of explanation, and the drawings and their elements are not necessarily drawn to scale. However, those skilled in the art will readily understand these details.

In addition, embodiments of the present invention are not intended to be limited to specific embodiments, and should be understood to include all transformations, equivalents, or substitutes included in the spirit and scope of the present invention.

The present invention relates to a liquid-crystal-material monomers including one or more of a rod-shaped or plate-shaped mesogen core (C), a silane-based group (S), and a polymerization reactive group (F), and a liquid-crystal polymer composition including a polymer of liquid-crystal-material monomers.

The liquid-crystal-material monomer including one or more of the rod-shaped or plate-shaped mesogen core (C), the silane-based group (S), and the polymerization reactive group (F) may specifically be of:

i) a type including the mesogen core (C) and the silane-based group (S) (Type 1 below);

ii) a type including the mesogen core (C), the silane-based group (S), and the polymerization reactive group (F) (Type 2 below);

iii) a type including the mesogen core (C) and the polymerization reactive group (F) (Type 3 below);

iv) a type including the silane-based group (S) (Type 4 below); or v) a type including the silane-based group (S) and the polymerization reactive group (F) (Type 5 below).

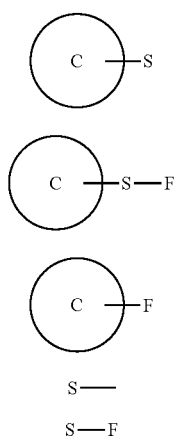

TYPE 1

TYPE 2

TYPE 3

TYPE 4

TYPE 5

In addition, the polymer of the liquid-crystal-material monomers may be
① a copolymer of two or more liquid-crystal-material monomers among liquid-crystal-material monomers of the types i) to v),
② a homopolymer in which the liquid-crystal-material monomers of the types i) to v) are each independently polymerized, or
③ a mixture of the copolymer and the homopolymer.

Polymerization of the polymer is carried out by heat, ultraviolet rays, chemicals, or the like by using a reaction, such as radical polymerization, condensation polymerization, cyclopolymerization, or ionic polymerization, and in the types of i) to v), the silane-based group (S) and the polymerization reactive group (F) may undergo a polymerization reaction at each position.

In addition, the copolymer and the homopolymer may form a polymer network by connecting polymerization reactive groups (F) of the liquid-crystal-material monomers of i) to v) together in the form of a chain derivative.

In addition, the homopolymer or the copolymer has a weight-average molecular weight of 1,000 to 100,000, preferably, 2,000 to 30,000.

Specifically, the rod-shaped or plate-shaped mesogen core (C) may be one or more of structures of Formulae 1 to 27, and the silane-based group (S) and/or the polymerization reactive group (F) may be bonded to one or more of bondable positions of the rod-shaped or plate-shaped mesogen core (C).

[Formula 1]

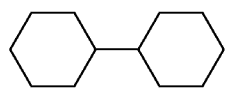

[Formula 2]

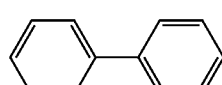

[Formula 3]

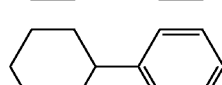

[Formula 4]

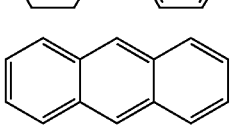

[Formula 5]

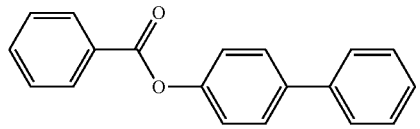

[Formula 6]

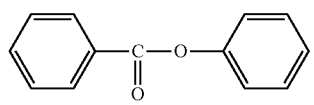

[Formula 7]

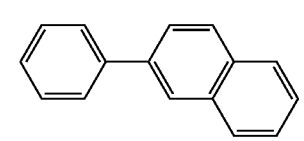

[Formula 8]

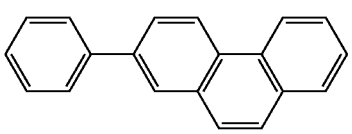

[Formula 9]

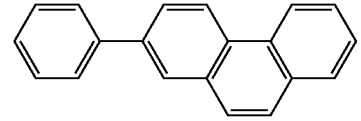

[Formula 10]

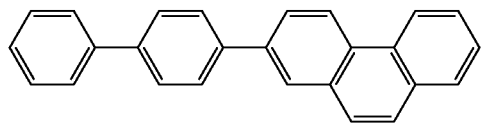

[Formula 11]

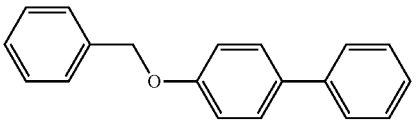

[Formula 12]

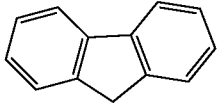

[Formula 13]

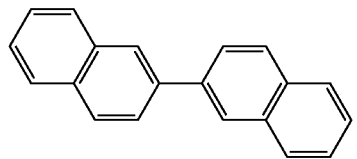

[Formula 14]

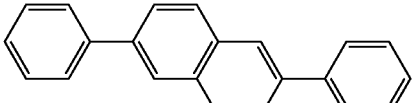

[Formula 15]

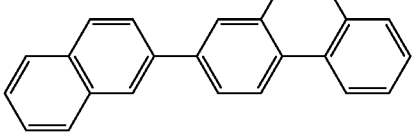

[Formula 16]
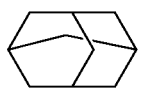
[Formula 17]
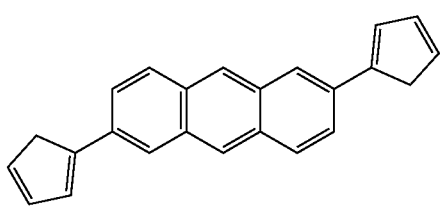
[Formula 18]
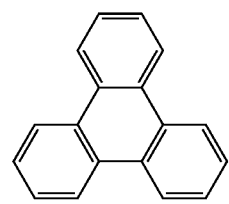
[Formula 19]
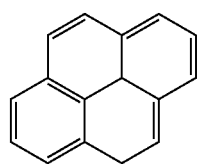
[Formula 20]
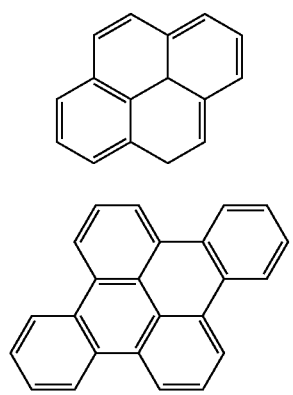
[Formula 21]
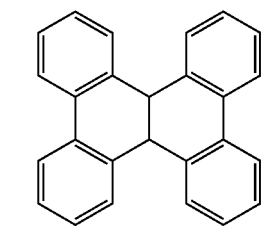
[Formula 22]
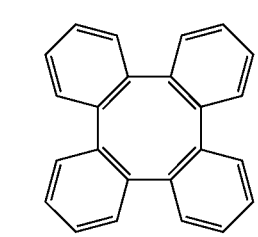
[Formula 23]
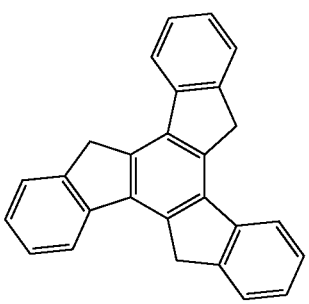
[Formula 24]
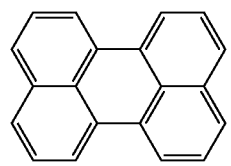
[Formula 25]
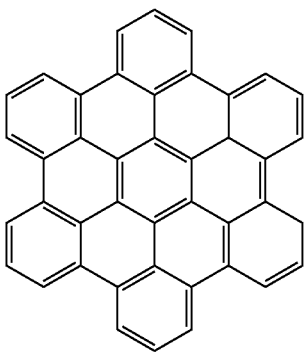
[Formula 26]
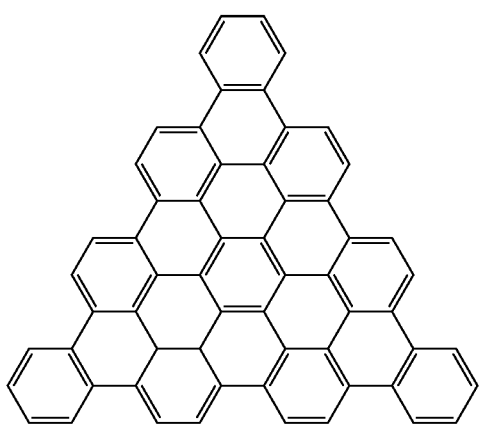

[Formula 27]

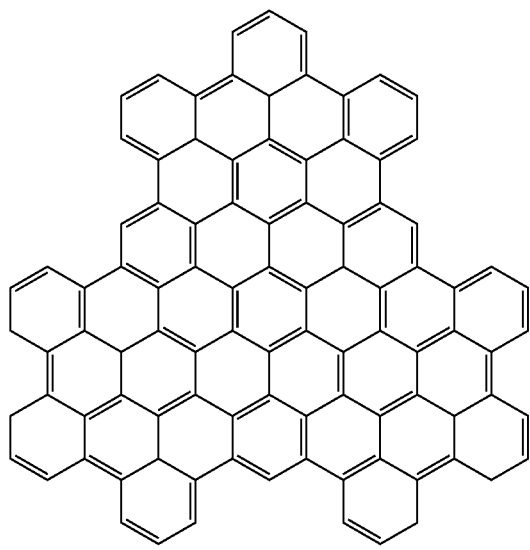

The silane-based group (S) may specifically be one or more of structures of Formulae of 28 to 33, and the mesogen core (C) and/or the polymerization reactive group (F) may be bonded to position of one or more substituents ("-") represented in the silane-based group (S).

[Formula 28]

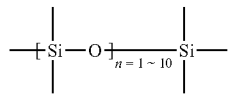

[Formula 29]

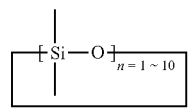

[Formula 30]

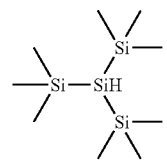

[Formula 31]

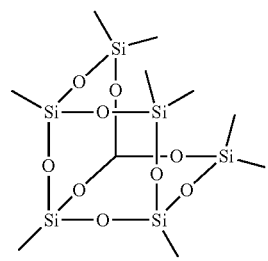

[Formula 32]

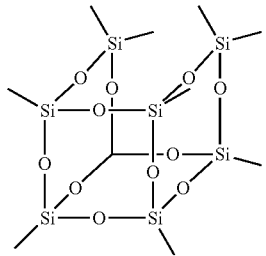

[Formula 33]

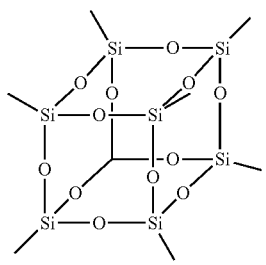

The polymerization reactive group (F) may specifically be one or more of structures of Formulae 34 to 43, and the mesogen core (C) and/or the silane-based group (S) may be bonded to position of substituent R represented in the polymerization reactive group (F).

[Formula 34]

[Formula 35]

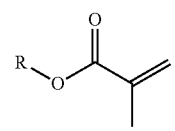

[Formula 36]

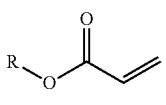

[Formula 37]

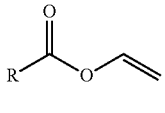

[Formula 38]

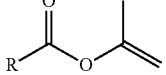

[Formula 39]

[Formula 40]

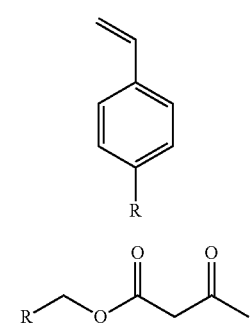

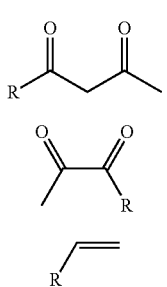

[Formula 41]

[Formula 42]

[Formula 43]

In addition, each of the mesogen core (C), the silane-based group (S), and the polymerization reactive group (F) may include a linking group (A) of hydrocarbon including a heteroatom, and structures of the mesogen core (C), the silane-based group (S), and the polymerization reactive group (F) of the liquid-crystal-material monomer of the liquid-crystal-material monomers of the types i) to v) may be connected to each other by using the linking group (A) of the hydrocarbon including the heteroatom.

The linking group (A) has a structure of "—(CH2)n-X—", n is an integer from 1 to 12, X is one or more of groups consisting of —O—, —S—, —SO2-, —NH—, —NHC(O)—, and —OC(O)—, and when the heteroatom of the linking group (A) is identical to a heteroatom of the polymerization reactive group (F), both identical heteroatoms are positioned so as not to be linked consecutively.

Examples of the liquid-crystal-material monomers of the types i) to v) are Formulae 44, 45, 46, and 47, the following structures are merely examples of the liquid-crystal-material monomers of the types i) to v), and the liquid-crystal-material monomers of the types i) to v) of the present invention are not limited to the following structures.

[Formula 44]

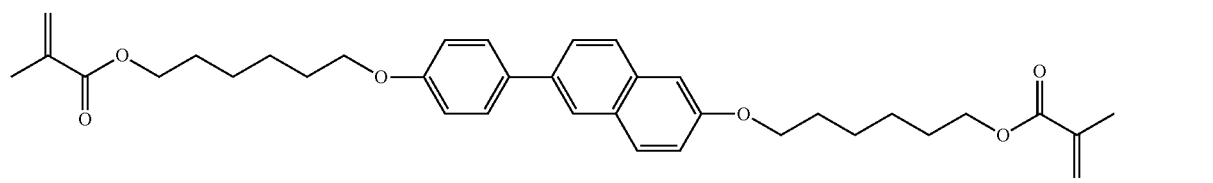

[Formula 45]

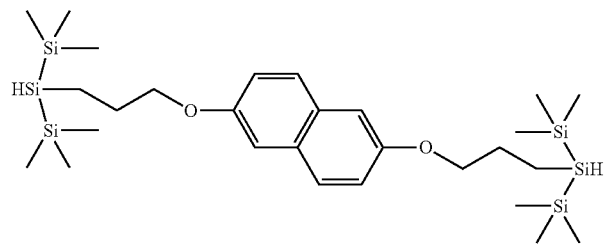

[Formula 46]

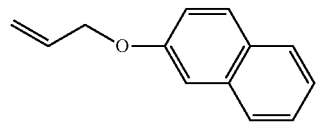

[Formula 47]

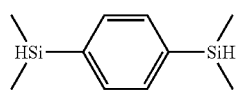

Hereinafter, dielectric characteristics of a low-dielectric and heat-dissipating film as a low-dielectric material using a liquid-crystal-material monomer according to an embodiment of the present invention, synthesis of a polymer including the same, and a liquid-crystal polymer composition including the polymer will be described.

EXAMPLE 1

1. Synthesis of Liquid-Crystal-Material Monomer: Compound 1

In order to produce a low-dielectric and heat-dissipating film as a dielectric material, Compound 1 as a liquid-crystal-material monomer including a polymerization reactive group in a rod-shaped mesogen core was synthesized by the following method.

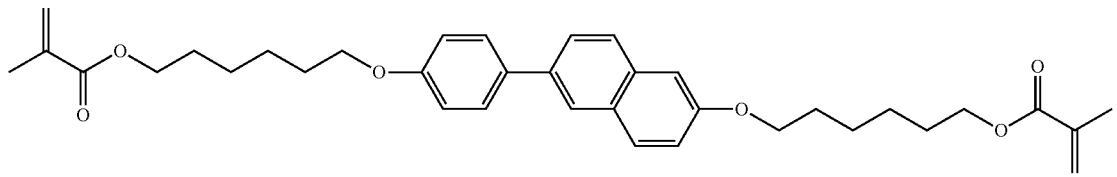

Compound 1

8-(4-(6-((8-hydroxyoctyl)oxy)naphthalen-2-yl) phenoxy) octan-1-ol (4.3 mmol) and 30 ml of DCM were placed in a round flask and then stirred. Methacryloyl chloride (8.6 mmol) and 1.2 ml of trimethylamine were added to a reactor and then stirred at room temperature for 12 hours. After completion of the reaction, impurities were removed by using 5% sodium chloride (400 ml), followed by recrystallization by using methanol. After the recrystallization, a precipitate was filtered by using a filter, followed by column chromatography by using ethyl acetate and hexane at a ratio of 1:3. Afterwards, a solvent was removed, followed by recrystallization by using ethanol, and then a precipitate was filtered through a filter to synthesize 6-(4-(6-(((6-(methacyloyloxy)hexyl)oxy) naphthalen-2-yl) phenoxy)hexyl methacrylate (Compound 1).

Figure 2:
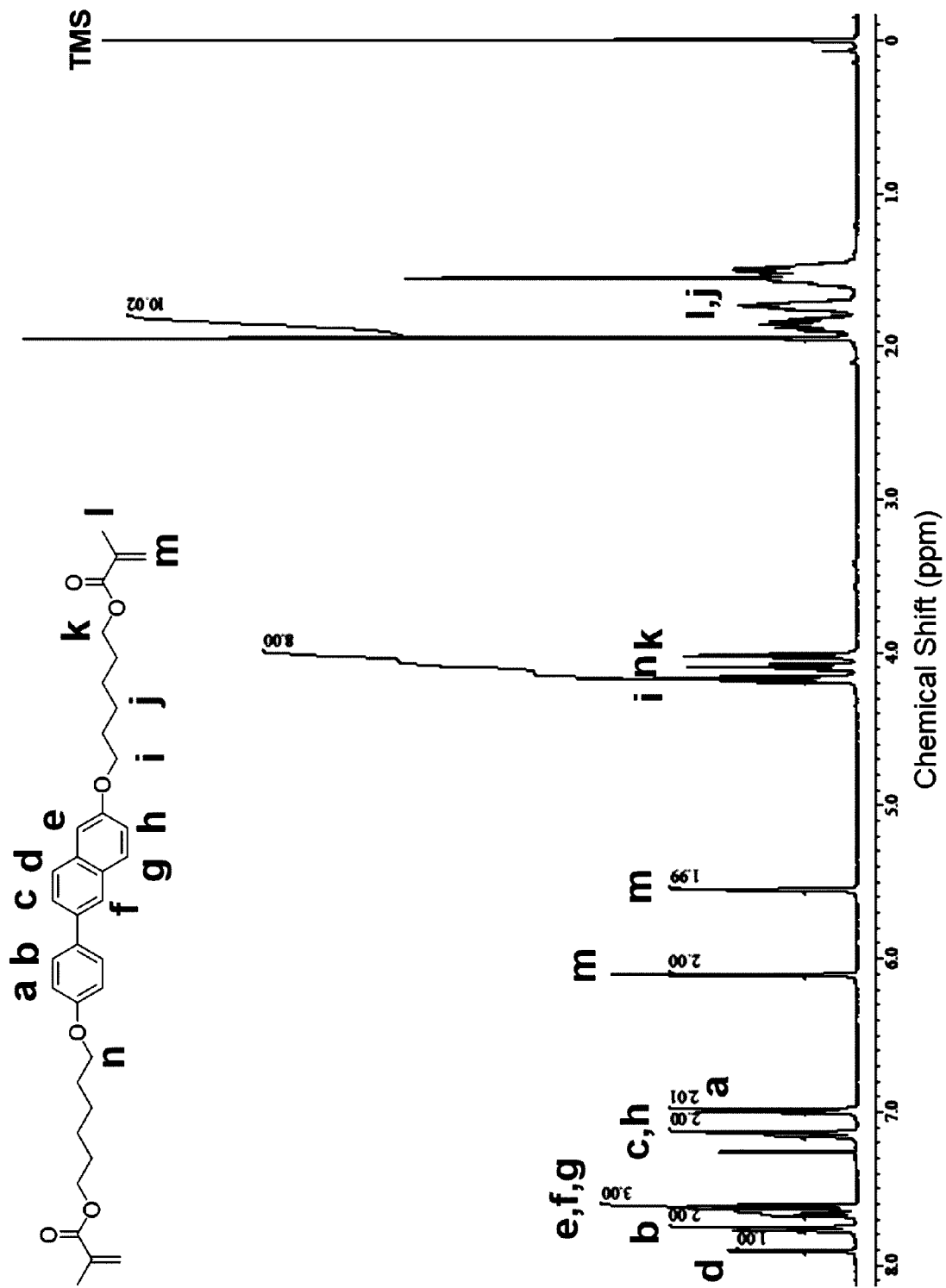
FIG. 2 shows NMR of a liquid-crystal-material monomer synthesized according to an embodiment of the present invention.

As a result of analyzing Compound 1 by nuclear magnetic resonance spectroscopy, it was found that the synthesis was successful without impurities (see FIG. 2).

2. Permittivity and Dielectric Loss of Low-Dielectric Material 1 Produced by Using Liquid-Crystal-Material Monomer of Formula 1

In order to produce low-dielectric and heat-dissipating film by using Compound 1, Compound 1 was placed on a glass substrate, and a temperature was raised to an isotropic-phase temperature of 200° C. to induce a liquid phase. Afterwards, another glass substrate was placed thereon as a cover, followed by curing for 1 hour at a liquid-crystal-phase temperature of 160° C. Afterwards, the glass substrate was etched by using hydrofluoric acid to obtain a polymer film (low-dielectric material 1).

Figure 3:
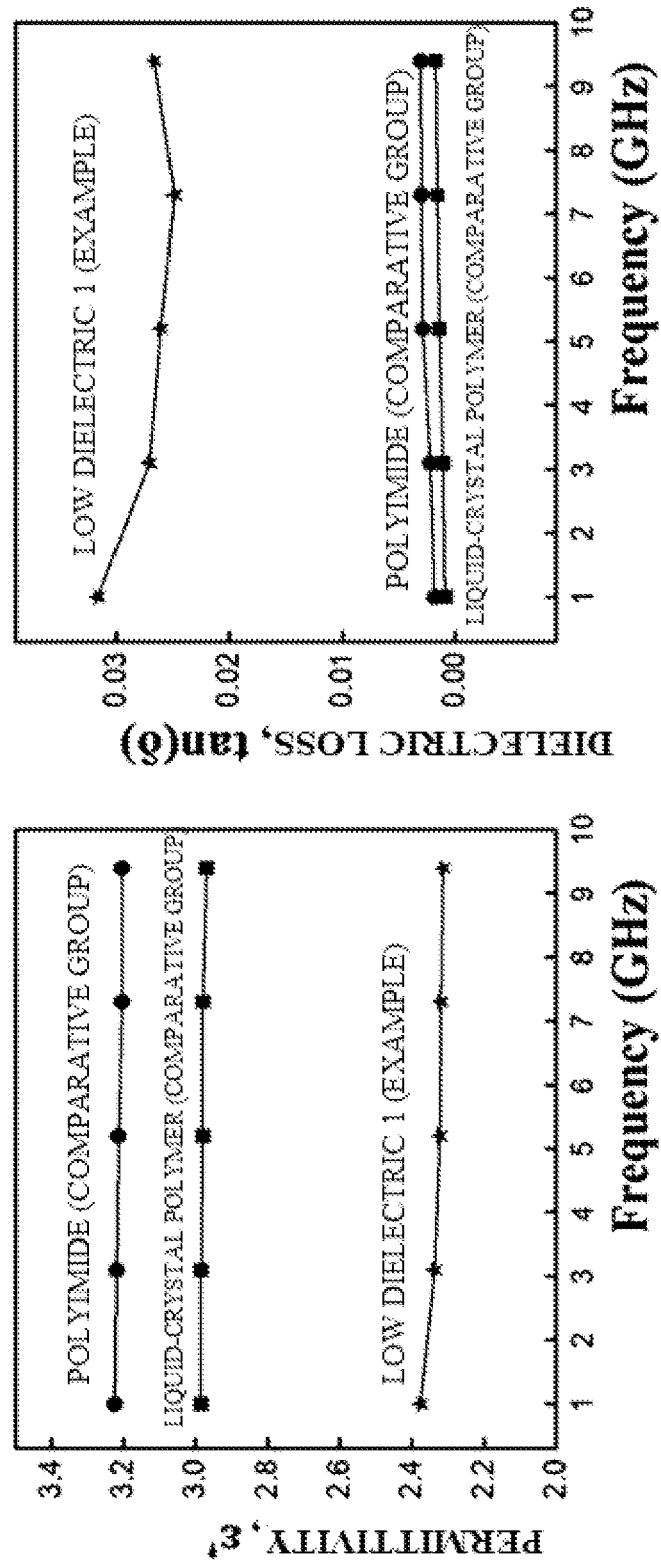
FIG. 3 is a graph showing permittivity and dielectric loss, which are dielectric characteristics, of a liquid-crystal-material monomer synthesized according to an embodiment of the present invention.

FIG. 3 shows a result of measuring permittivity and dielectric loss of the polymer film from the 1.0 GHz band to the 9.4 GHz band. As a result of measuring the permittivity, the permittivity was about 2.3, showing excellent low-permittivity characteristics, and as a result of measuring the dielectric loss, the dielectric loss was about 0.028. In particular, it was found that the permittivity was significantly lower than the highest level (permittivity of 2.9 by liquid-crystal polymers of the related art) currently commercialized.

EXAMPLE 2

1. Synthesis of Liquid-Crystal-Material Monomer: Compound 2

Compound 2 as a liquid-crystal-material monomer including a silane-based group in a rod-shaped mesogen core was synthesized by the following method.

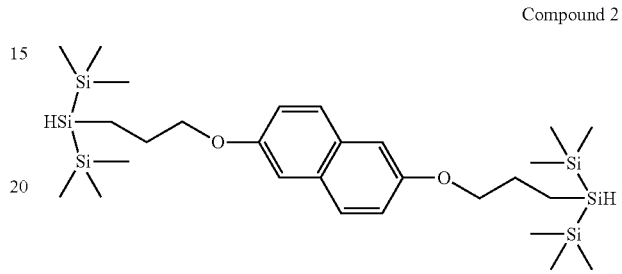

Compound 2

1.9 ml of 1,1,1,3,3,3-hexamethyl-2-(trimethylsilyl)trisilane, 2,6-bis(allyloxyl)naphthalene (2.08 mmol), and 2,2-dimethoxy-2-phenylacetophenone (0.06 mmol) as a photoinitiator was placed in a round flask, and then a trace of tetrahydrofuran was added thereto to such an extent as to dissolve a reactant, followed by exposure to light for 1 hour under nitrogen. After completion of the reaction, 10 ml of tetrahydrofuran and potassium tert-butoxide (0.86 mmol) were further added thereto, followed by stirring for 24 hours at room temperature. Next, after titration in a beaker containing 2N HCl (125 ml), impurities were removed by using ethyl acetate and water. Column chromatography was carried out by using chloroform to synthesize Compound 2.

Figure 4:
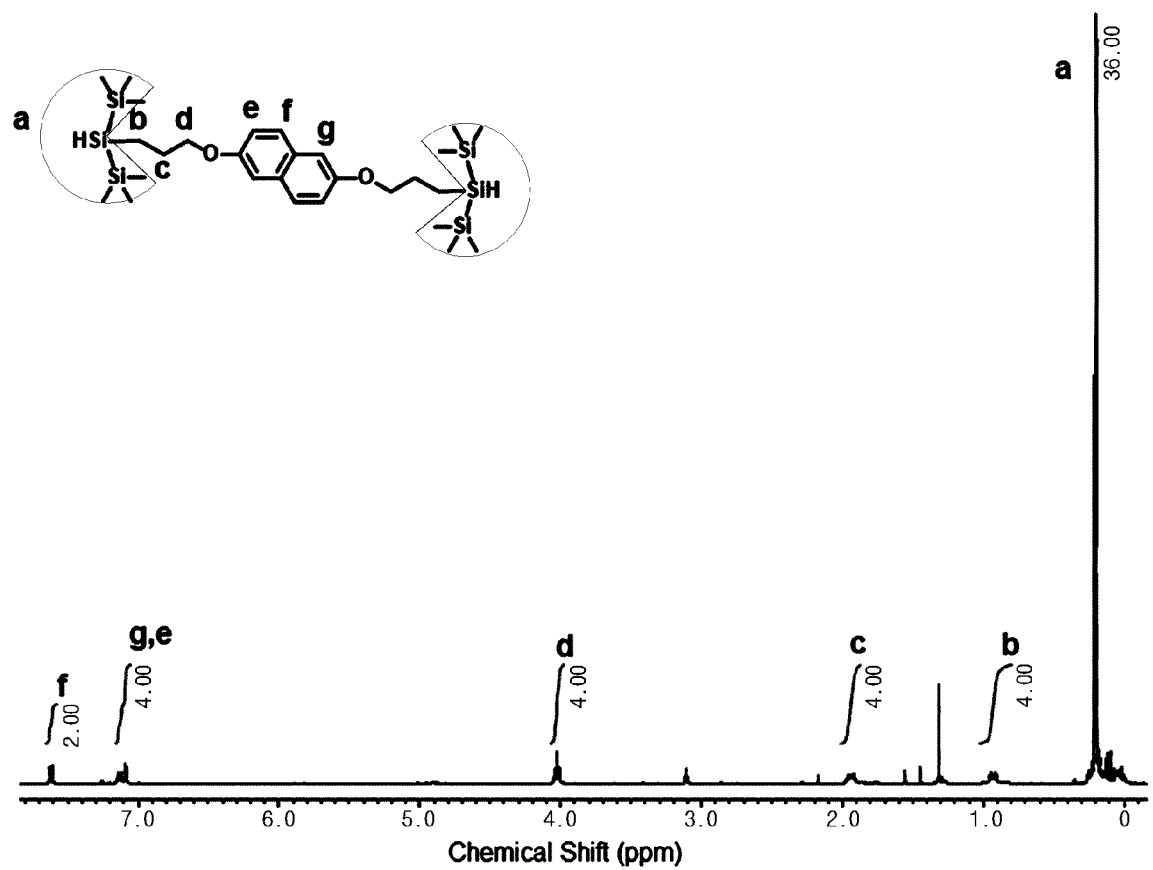
FIG. 4 shows NMR of a liquid-crystal-material monomer synthesized according to an embodiment of the present invention.

As a result of analyzing Compound 2 by nuclear magnetic resonance spectroscopy, it was found that the synthesis was successful without impurities (see FIG. 4).

EXAMPLE 3

1. Synthesis of Liquid-Crystal-Material Monomer: Compound 3

Compound 3 as a liquid-crystal-material monomer including a polymerization reactive group in a rod-shaped mesogen core was synthesized by the following method.

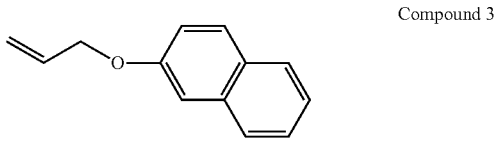

Compound 3

Naphthalene-2,6-diol (2 g), allyl bromide (4.3 ml), potassium carbonate (10.4 g), and dimethylformamide (30 ml) were placed in a round flask and then stirred for 24 hours. After completion of the reaction, impurities were removed by using ethyl acetate and water. Recrystallization was carried out by using hexane to synthesize Compound 3.

Figure 5:
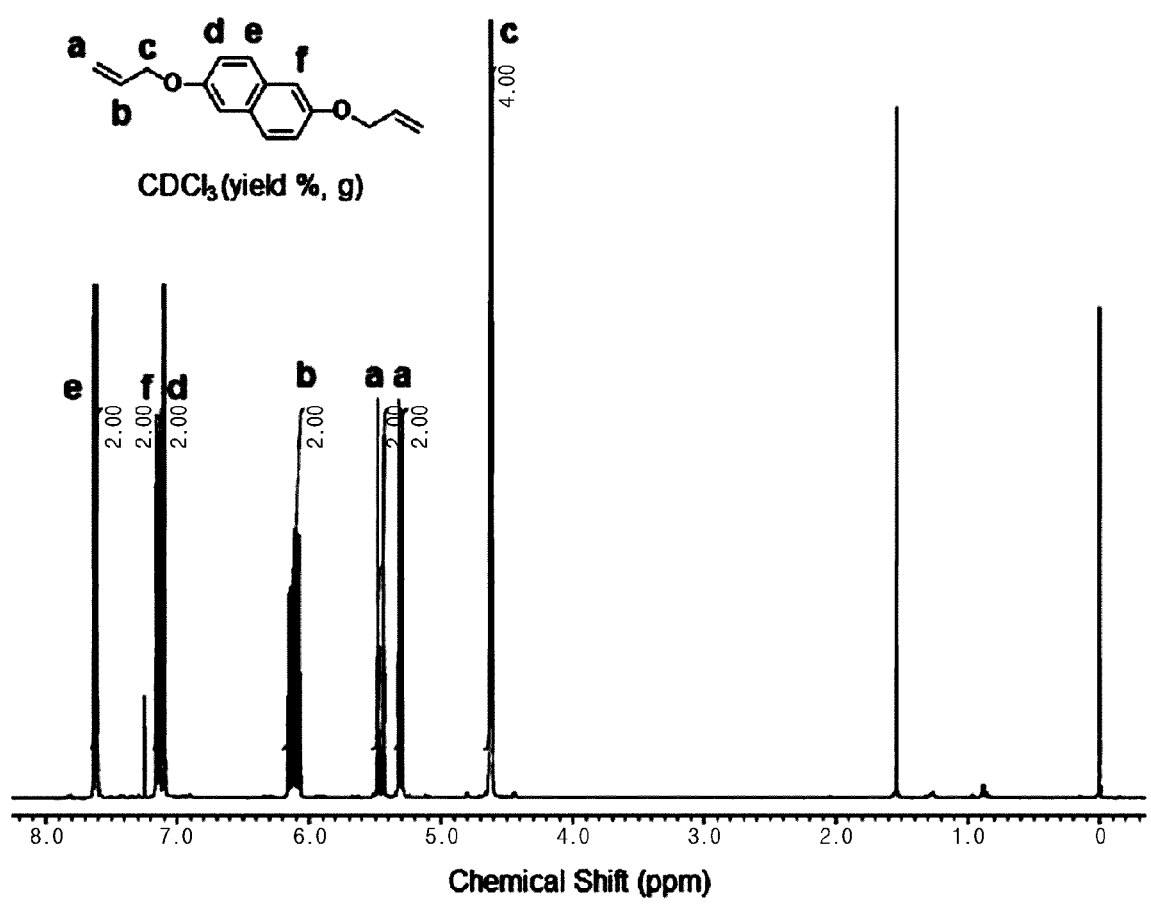
FIG. 5 shows NMR of a liquid-crystal-material monomer synthesized according to an embodiment of the present invention.

As a result of analyzing Compound 3 by nuclear magnetic resonance spectroscopy, it was found that the synthesis was successful without impurities (see FIG. 5).

EXAMPLE 4

1. Synthesis of Liquid-Crystal-Material Monomer: Compound 4

Compound 4 as a liquid-crystal-material monomer including a silane-based group in a rod-shaped mesogen core was synthesized by the following method.

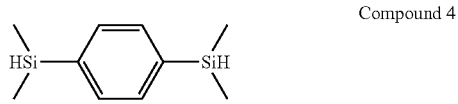

Compound 4

30 ml of tetrahydrofuran was added to 1,4-dibromobenzene (6.9 g) and magnesium (1.3 g) in a round flask. After 0° C. condition was formed, dimethylsilyl chloride (5.1 g) was dissolved in 20 ml of tetrahydrofuran, then slowly placed in a flask to be stirred for 14 hours. Next, an extraction process was carried out by using hexane, and synthesis was completed through distillation.

Figure 6:
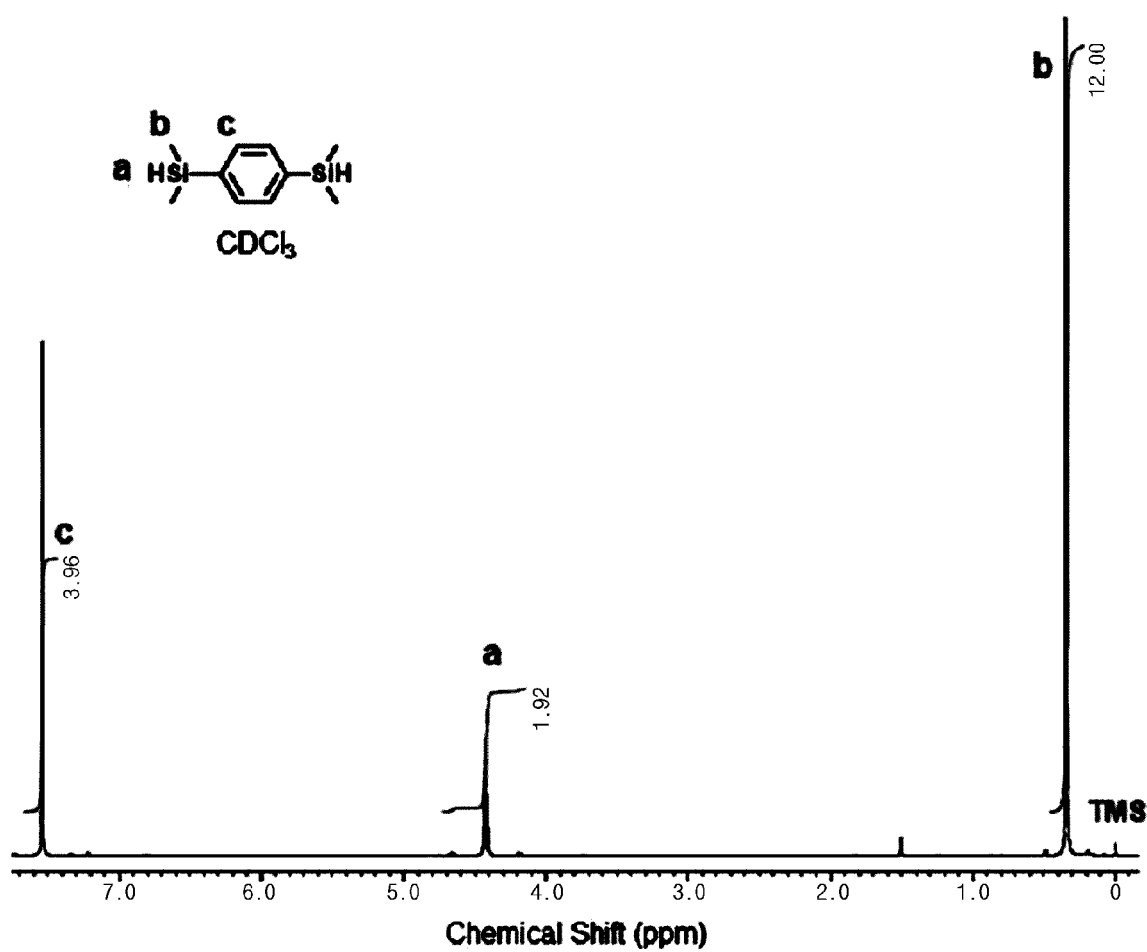
FIG. 6 shows NMR of a liquid-crystal-material monomer synthesized according to another embodiment of the present invention.

As a result of analyzing Compound 4 by nuclear magnetic resonance spectroscopy, it was found that the synthesis was successful without impurities (see FIG. 6).

EXAMPLE 5

1. Polymer 1 of Liquid-Crystal-Material Monomer

In order to produce a low-dielectric and heat-dissipating film as a dielectric material using a liquid-crystal polymer composition, polymer 1 including a rod-shaped mesogen core, a silane-based group, and a polymerization reactive group, as a polymer included in the liquid-crystal polymer composition, was synthesized by the following method.

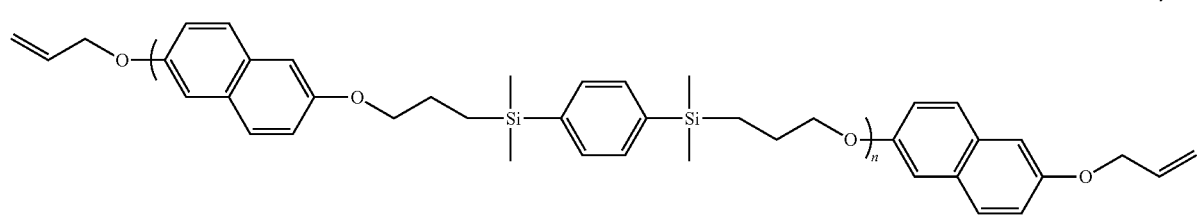

Polymer 1

A mixture of Compound 3 (5 g), karstedt's catalyst in xylene (0.13 ml), Compound 4 (4.4 ml), and 100 ml of toluene in a round flask was stirred at 100° C. for 24 hours. After completion of the reaction, a celite filter was carried out, and a precipitate was collected by using methanol. The precipitate was filtered and dried to obtain Compound 5. In Compound 5, n was 35, and a weight-average molecular weight was about 15,000.

Figure 7:
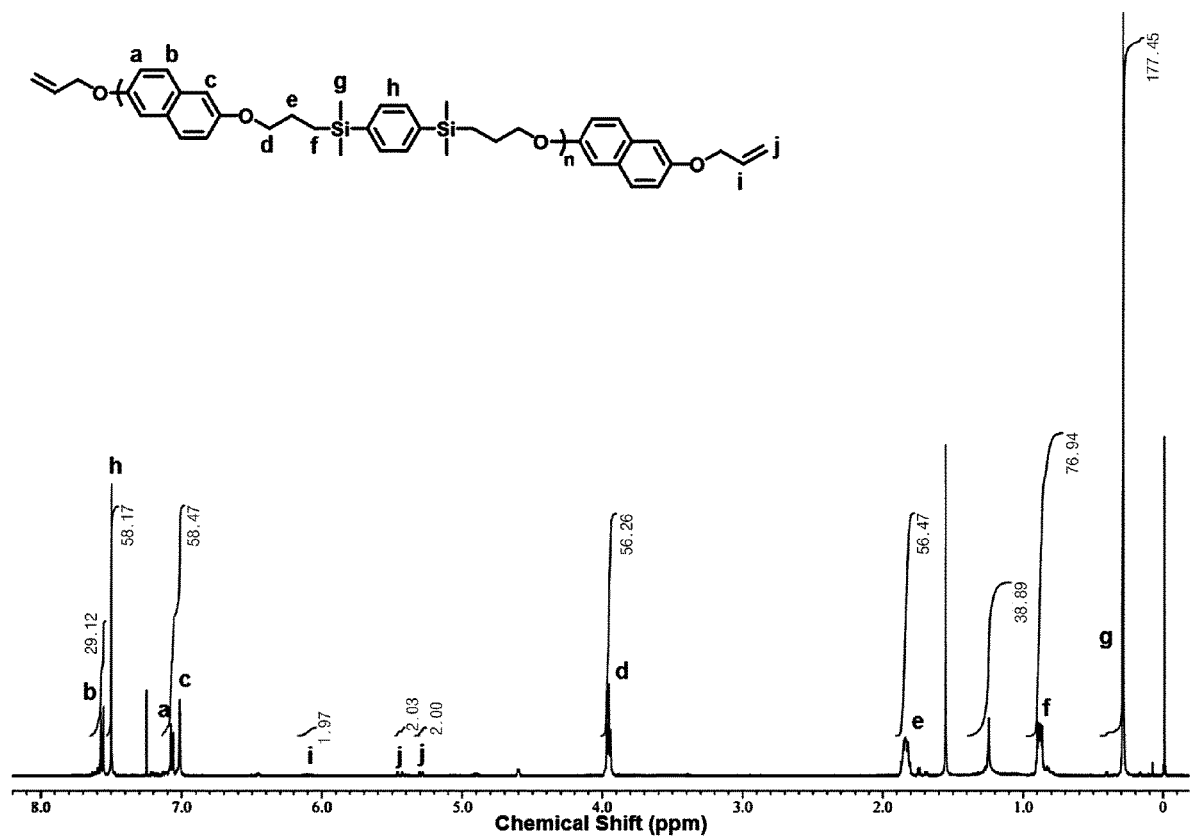
FIG. 7 shows NMR of a liquid-crystal-material monomer synthesized according to an embodiment of the present invention.

As a result of analyzing Compound 5 by nuclear magnetic resonance spectroscopy, it was found that the synthesis was successful without impurities (see FIG. 7).

2. Permittivity and Dielectric Loss of Low-Dielectric Material 2 Produced by Using Liquid-Crystal Polymer Composition Including Polymer 1

In order to produce a low-dielectric and heat-dissipating film by using polymer 1, a PDMS mold was manufactured to obtain a rectangular polymer film (low-dielectric material 2) at 150° C.

Figure 8:
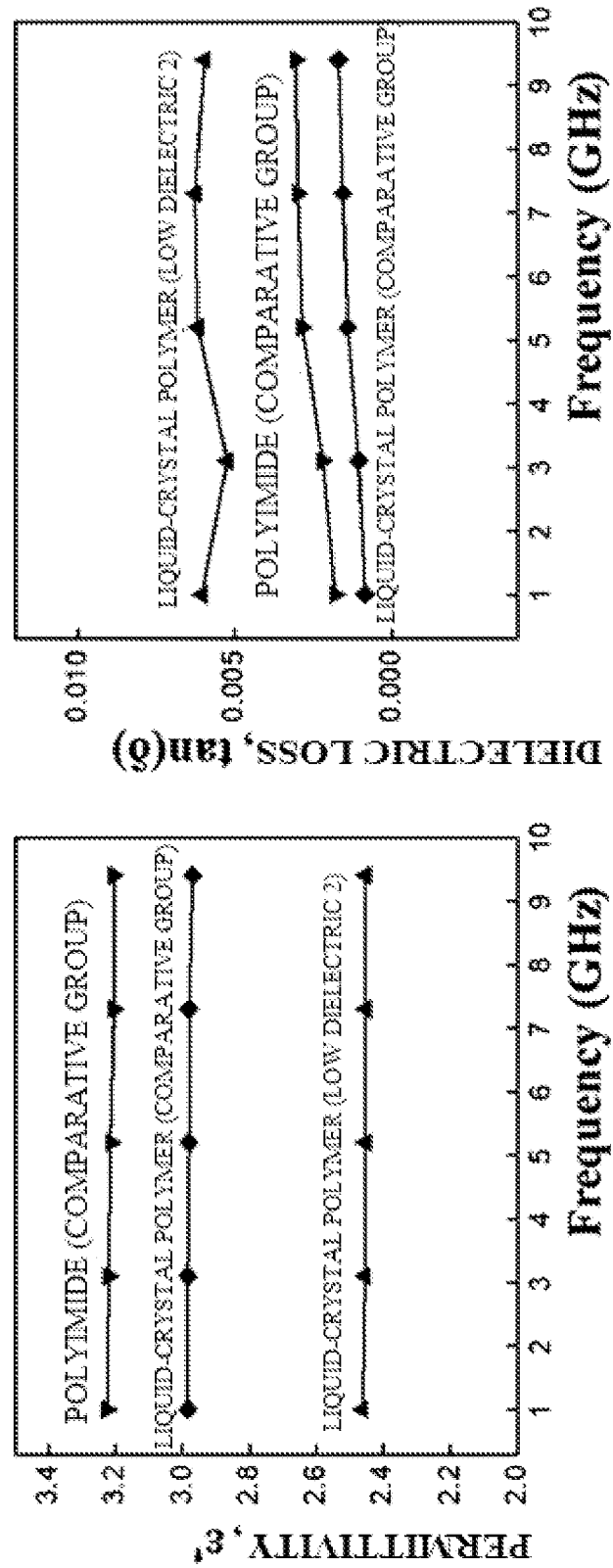
FIG. 8 shows dielectric characteristics of a low-dielectric and high-heat-dissipating film made of a liquid-crystal polymer composition including a liquid-crystal-material monomer synthesized according to an embodiment of the present invention.

FIG. 8 shows a result of measuring permittivity and dielectric loss of the polymer film from the 1.0 GHz band to the 9.4 GHz band. As a result of measuring the permittivity, the permittivity was about 2.4, showing excellent low-permittivity characteristics, and as a result of measuring the dielectric loss, the dielectric loss was about 0.0-5. In particular, it was found that the permittivity was significantly lower than the highest level (permittivity of 2.9 by liquid-crystal polymers of the related art) currently commercialized.

As described above, by using a low-dielectric and high-heat-dissipating liquid-crystal-material monomer and a liquid-crystal polymer composition including a polymer thereof, it is possible to develop low-dielectric materials that may be used not only for next-generation high-speed communication antennas and millimeter wave radars for 5G and 6G, but also for communication convergence services, such as self-driving cars, healthcare, and smart cities.

Hereinbefore, specific parts of the present invention is described in detail, and for those skilled in the art, it will be clear that these specific descriptions are merely preferred embodiments, and the scope of the present invention is not limited thereby. Accordingly, the substantial scope of the present invention will be defined by the appended claims and their equivalents.

The present invention is filed with the support of the following project described in Table 1.

TABLE 1

| National Research and Development Program Supporting This Invention | |
|---|---|
| Serial Number | 2020M3D1A2100779 |
| Department Name | Ministry of Science and ICT |

TABLE 1-continued

| National Research and Development Program Supporting This Invention | |
|---|---|
| Research Managing Organization | National Research Foundation of Korea (NRF) |
| Title of Research | Innovative Technology Development Program for Material Fusion |
| Title of Research Project | Development of low-dielectric and high-heat-dissipating liquid-crystal polymer film for 5G FCCL |
| Host Organization | Jeonbuk National University |
| Research Period | Jul. 23, 2020-Dec. 31, 2023 |

The invention claimed is:

1. A liquid-crystal-material monomer that is low-dielectric and high-heat-dissipating for a millimeter wave band, the liquid-crystal-material monomer being:
   a first monomer comprising a rod-shaped or plate-shaped mesogen core, a silane-based group, and a polymerization reactive group; or a second monomer comprising the rod-shaped or plate-shaped mesogen core and the polymerization reactive group; or a third monomer comprising the silane-based group and the polymerization reactive group, wherein the polymerization reactive group is one or more structures selected from structures of Formulae 34 to 43:

[Formula 34]

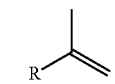

[Formula 35]

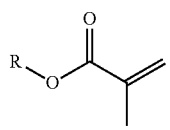

[Formula 36]

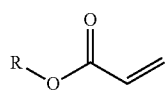

[Formula 37]

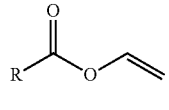

[Formula 38]

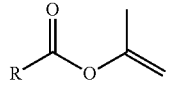

[Formula 39]

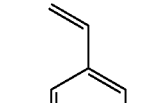

[Formula 40]

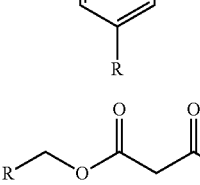

[Formula 41]

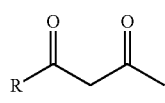

[Formula 42]

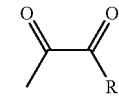

[Formula 43]

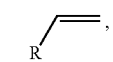

wherein the R in each of the Formulae 34 to 43 is a substituent being at least one linking group, each of the at least one linking group having a structure of —(CH$_2$)n-X—, where n is an integer from 1 to 12 and X is one selected from —O—, —S—, —SO$_2$-, —NH—, —NHC(O)—, and —OC(O)—, wherein the rod-shaped or plate-shaped mesogen core or the silane-based group is connected to the polymerization reactive group by being bonded to the X or a terminal CH$_2$ of the at least one linking group, and wherein, in the Formulae 35 and 36, when the at least one linking group includes an oxygen atom, the oxygen atom included in the at least one linking group and another oxygen atom of the Formula 35 or 36 bonded to the at least one linking group are positioned such that the oxygen atom included in the at least one linking group and the another oxygen atom are not linked consecutively.

2. A liquid-crystal polymer composition for a millimeter wave band, comprising a polymer of the liquid-crystal-material monomer for the millimeter wave band of claim 1.

3. The liquid-crystal polymer composition of claim 2, wherein the polymer has:

a homopolymer of the first monomer, the second monomer, or the third monomer, a copolymer including two or more monomers selected from the first monomer, the second monomer, and the third monomer, the two or more monomers being different from each other, or a mixture of the homopolymer and the copolymer.

4. The liquid-crystal polymer composition of claim 2, wherein the polymer has a weight-average molecular weight of 1,000 to 100,000.

5. A low-dielectric material comprising the liquid-crystal polymer composition of claim 2.

6. A low-dielectric material comprising the liquid-crystal polymer composition of claim 3.

7. A low-dielectric material comprising the liquid-crystal polymer composition of claim 4.

8. A liquid-crystal polymer composition that is low-dielectric and high-heat-dissipating for a millimeter wave band, the liquid-crystal polymer composition comprising:

Compound 3 and Compound 4:

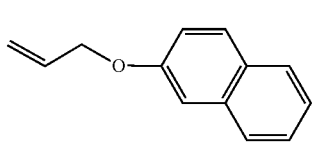

Compound 3

Compound 4

9. A liquid-crystal polymer composition that is low-dielectric and high-heat-dissipating for a millimeter wave band, the liquid-crystal polymer composition comprising Polymer 1:

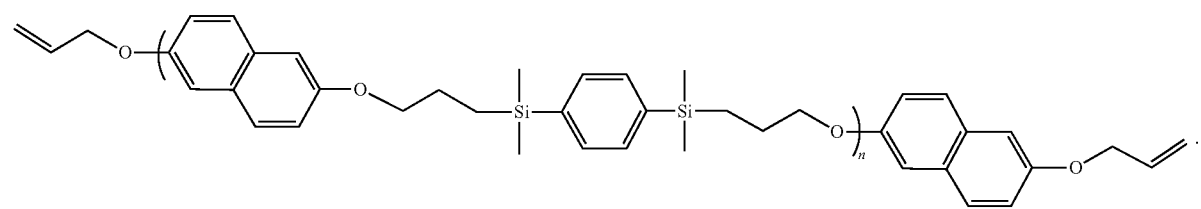
Polymer 1
* * * * *